(12) United States Patent
Enhessari et al.

(10) Patent No.: US 8,512,654 B2
(45) Date of Patent: Aug. 20, 2013

(54) STRONTIUM CERATE NANOPARTICLE SYNTHESIS METHOD

(75) Inventors: Morteza Enhessari, Naragh (IR); Keyvan Ozaee, Naragh (IR); Maryam Shaterian, Naragh (IR); Elham Karamali, Naragh (IR)

(73) Assignee: Pooya Nano Powders Research Group, Tehran (IR)

( * ) Notice: Subject to any disclaimer, the term of this patent is extended or adjusted under 35 U.S.C. 154(b) by 247 days.

(21) Appl. No.: 13/007,704

(22) Filed: Jan. 17, 2011

(65) Prior Publication Data

US 2011/0117367 A1    May 19, 2011

(51) Int. Cl.
*C01F 1/00*    (2006.01)
*C01F 11/02*   (2006.01)

(52) U.S. Cl.
USPC .......... 423/21.1; 423/155; 423/158; 423/263; 423/593.1; 423/594.16

(58) Field of Classification Search
USPC ............... 423/155, 179, 202, 594.15, 594.16, 423/635, 636, 641; 568/300, 700
See application file for complete search history.

(56) References Cited

U.S. PATENT DOCUMENTS

| | | | | |
|---|---|---|---|---|
| 4,489,000 A | * | 12/1984 | Gradeff et al. | 534/15 |
| 4,663,439 A | * | 5/1987 | Gradeff et al. | 534/15 |
| 7,838,141 B2 | * | 11/2010 | Marina et al. | 429/495 |
| 2009/0202714 A1 | * | 8/2009 | Mandzy et al. | 427/164 |
| 2010/0135937 A1 | * | 6/2010 | O'Brien et al. | 424/59 |

OTHER PUBLICATIONS

Voigts et al., Synthesis and characterization of strontium titanate nanparticles as potential high temperature oxygen sensor material, J. of Nanomaterials, vol. 2006, Article ID 63154, pp. 1-6, 2006. (DOI 10.1155/JNM/2006/63154).*
Schmid et al., Synthesis and thermal evolution of strontium cerate, J. of Mater. Sci. Lett. 7 (1988) 613-615.*
Scholten et al., Synthesis of SrCeO3, BaCeO3, SrZrO3, and BaZrO3, and their reaction with CO2 (circa. 1993).*

* cited by examiner

*Primary Examiner* — Hoa (Holly) Le

(57) ABSTRACT

A method for synthesizing strontium cerate ($SrCeO_3$) nanoparticles is disclosed. Initially, ammonium cerium(IV) nitrate (($NH_4$)$_2$$Ce(NO_3)_6$) and n-butanol ($C_4H_{10}O$) are reacted to synthesize cerium-n-butoxide ($Ce(OBu)_4$). Next, the cerium-n-butoxide, strontium acetate ($Sr(CH_3COO)_2$), and stearic acid ($C_{18}H_{36}O_2$) are reacted to form a homogenous product including the strontium cerate nanoparticles. Finally, the strontium cerate nanoparticles are isolated from the homogenous product.

6 Claims, 6 Drawing Sheets

STRONTIUM CERATE NANOPARTICLE SYNTHESIS METHOD

SPONSORSHIP STATEMENT

This application has been sponsored by the Iranian Nanotechnology Initiative Council and the Naragh Branch of the Islamic Azad University, which do not have any rights in this application.

TECHNICAL FIELD

This application generally relates to proton conducting materials, and more particularly relates to a method for synthesis of a proton conducting material, such as, for example, strontium cerate nanoparticles.

BACKGROUND

Fuel cells are expected to play an important role in the future of power generation. As such, a high interest currently exists in synthesizing materials that can conduct protons and/or oxide ions due to their potential use in fuel cells, hydrogen pumps, and hydrogen sensors. Recently, proton-conducting electrolytes from the $AZrO_3$ and $ACeO_3$ families, where A can be calcium (Ca), strontium (Sr), or barium (Ba) have been extensively investigated. For example, strontium cerate ($SrCeO_3$) particles can conduct protons at high temperatures, such as temperatures exceeding 500° C. in hydrogen-containing atmospheres, enabling their use in various fuel cells. Therefore, there exists a need for a novel method to prepare strontium cerate particles having a higher purity and homogeneity with controllable physicochemical properties.

SUMMARY

A method for synthesizing strontium cerate ($SrCeO_3$) nanoparticles is disclosed. Initially, ammonium cerium(IV) nitrate (($NH_4$)$_2$Ce($NO_3$)$_6$) and n-butanol ($C_4H_{10}O$) are reacted to synthesize cerium-n-butoxide (Ce(OBu)$_4$). Next, the cerium-n-butoxide, strontium acetate (Sr($CH_3COO$)$_2$), and stearic acid ($C_{18}H_{36}O_2$) are reacted to form a homogenous product including the strontium cerate nanoparticles. Finally, the strontium cerate nanoparticles are isolated from the homogenous product.

In some embodiments, the n-butanol can be 1-butanol. Ammonium nitrate ($NH_4NO_3$) can be removed from the solution including the synthesized cerium-n-butoxide.

In some embodiments, the homogenous product can be a homogenous solution. The homogenous product can be cooled to room temperature. The homogenous solution can be dried in a heated environment to form a homogenous gel. The homogenous gel can be calcined at a temperature between 800° C. and 1000° C. and, preferably, at 1000° C. for two hours. The stearic acid can be melted stearic acid.

Strontium cerate nanoparticles can be synthesized by reacting ammonium cerium(IV) nitrate and n-butanol to synthesize cerium-n-butoxide, reacting the cerium-n-butoxide, strontium acetate, and stearic acid to form a homogenous product including the strontium cerate nanoparticles, and isolating the strontium cerate nanoparticles from the homogenous product.

In some embodiments, the strontium cerate nanoparticles can have pure perovskite structures and have a crystalline size ranging between 21 nm and 32 nm.

Details of one or more embodiments and/or implementations of the strontium cerate synthesis method are set forth in the accompanying drawings and the description below. Other aspects that can be implemented will be apparent from the description and drawings, and from the claims.

DESCRIPTION OF DRAWINGS

Like reference symbols indicate like elements throughout the specification and drawings.

DETAILED DESCRIPTION

A method of synthesizing strontium cerate nanoparticles having a homogenous structure is disclosed. Cerium-n-botoxide, as the cerium source, strontium acetate, as the strontium source, and stearic acid, as the complexing agent, were reacted to synthesize the strontium cerate nanoparticles. Analysis of the nanoparticles demonstrated that the strontium cerate nanoparticles have pure perovskite structures with a crystalline size ranging between about 21 nm and 32 nm. In comparison with strontium cerate particles synthesized according to prior methods, the strontium cerate nanoparticles synthesized according to the method of this application exhibited a more uniform morphology and had smaller particle sizes.

Figure 1:
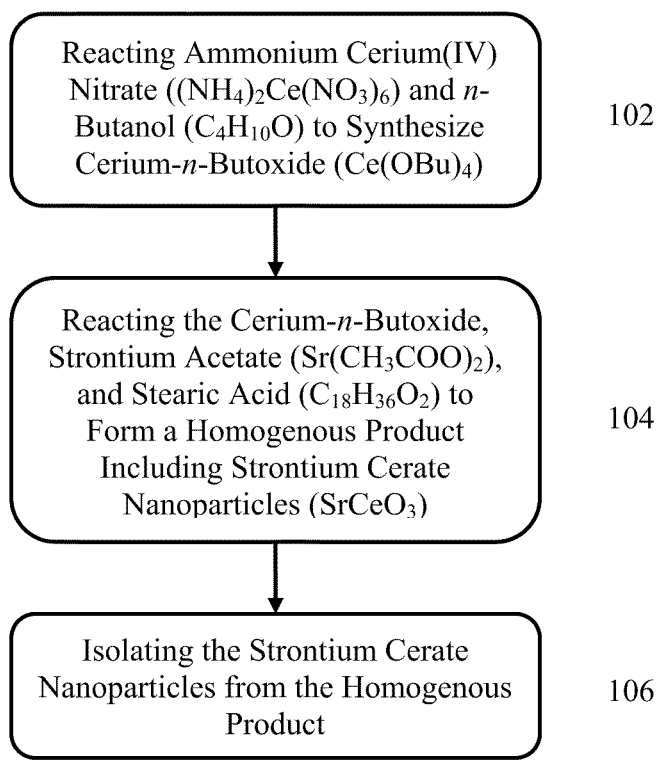
FIG. 1 illustrates a flowchart of an example of a method for synthesis of strontium cerate nanoparticles.

Referring to FIG. 1, an example of a method for synthesis of strontium cerate nanoparticles is disclosed. The method can be, for example, a sol-gel method. Referring to step 102, ammonium cerium(IV) nitrate (($NH_4$)$_2$Ce($NO_3$)$_6$) and n-butanol ($C_4H_{10}O$) are reacted to synthesize cerium-n-butoxide (Ce(OBu)$_4$). n-Butanol, i.e., n-butyl alcohol or normal butanol, is a primary alcohol with a four-carbon structure. Ammonium cerium(IV) nitrate, i.e., cerium(IV) ammonium nitrate, ceric ammonium nitrate, or CAN, is an oxidizing agent. In some implementations, the n-butanol to be reacted with ammonium cerium(IV) nitrate can be 1-butanol.

In addition to cerium-n-butoxide, ammonium nitrate ($NH_4NO_3$) is also synthesized as a result of the reaction of ammonium cerium(IV) nitrate and n-butanol in step 102. In some embodiments, the ammonium nitrate can be filtered and separated from the solution of cerium-n-butoxide.

In some embodiments, to synthesize the cerium-n-butoxide, 0.1 mol of ammonium cerium(IV) nitrate can be mixed with 0.4 mol of n-butanol in an excess of n-butanol. The solution can be mixed for 6 hours at, for example, room temperature.

Referring to step 104, the cerium-n-butoxide synthesized in step 102, strontium acetate (Sr($CH_3COO$)$_2$), and melted stearic acid ($C_{18}H_{36}O_2$, or $CH_3(CH_2)_{16}COOH$) are reacted to form a homogenous product including strontium cerate nanoparticles. The cerium-n-butoxide can be the cerium source for the strontium cerate nanoparticles, the strontium acetate can be the strontium source for the strontium cerate nanoparticles, and the stearic acid can be the complexing agent for the reaction of step 104. In some embodiments, the stearic acid can be melted stearic acid. The homogenous product can be a homogenous solution, i.e., sol. The carboxylic acid group and long carbon chains in stearic acid endow it with strong ability to disperse metal precursors.

In some embodiments, to form the homogenous solution, 0.1 mol of cerium-n-butoxide can be mixed with 0.1 mol of strontium acetate in a solution of 0.4 mol of melted stearic acid. The solution can be mixed for 24 hours, for example, at a temperature of 100° C.

Referring to step 106, the strontium cerate nanoparticles are isolated from the homogenous product. In some embodiments, the homogenous product, such as the homogenous solution, can initially be cooled to room temperature. The cooled homogenous solution can then be dried in a heated environment, such as, for example, an oven at a temperature ranging between 100° C. to 180° C. and, preferably, 150° C. for 12 hours to obtain a homogenous gel. Next, the gel can be calcined at a temperature ranging between 800° C. and 1000° C. for two hours to isolate the strontium cerate nanopowder. Calcining involves heating the gel to an indicated temperature until substantially all solvent within the gel is evaporated and the non-volatile material, such as the strontium cerate nanoparticles, is crystallized. Preferably, the gel can be calcined at a temperature of 1000° C. to isolate the strontium cerate nanopowder.

The strontium cerate nanopowder was characterized by various methods. First, x-ray diffraction (XRD) patterns of the strontium cerate nanopowder were recorded using a Seifert XRD 3003 PTS diffractometer system using Cu Kα radiation ($\lambda$=0.15418 nm) in the range of 10° to 80° (2θ) to examine the crystallization and structural development of the strontium cerate nanopowder.

Figure 2:
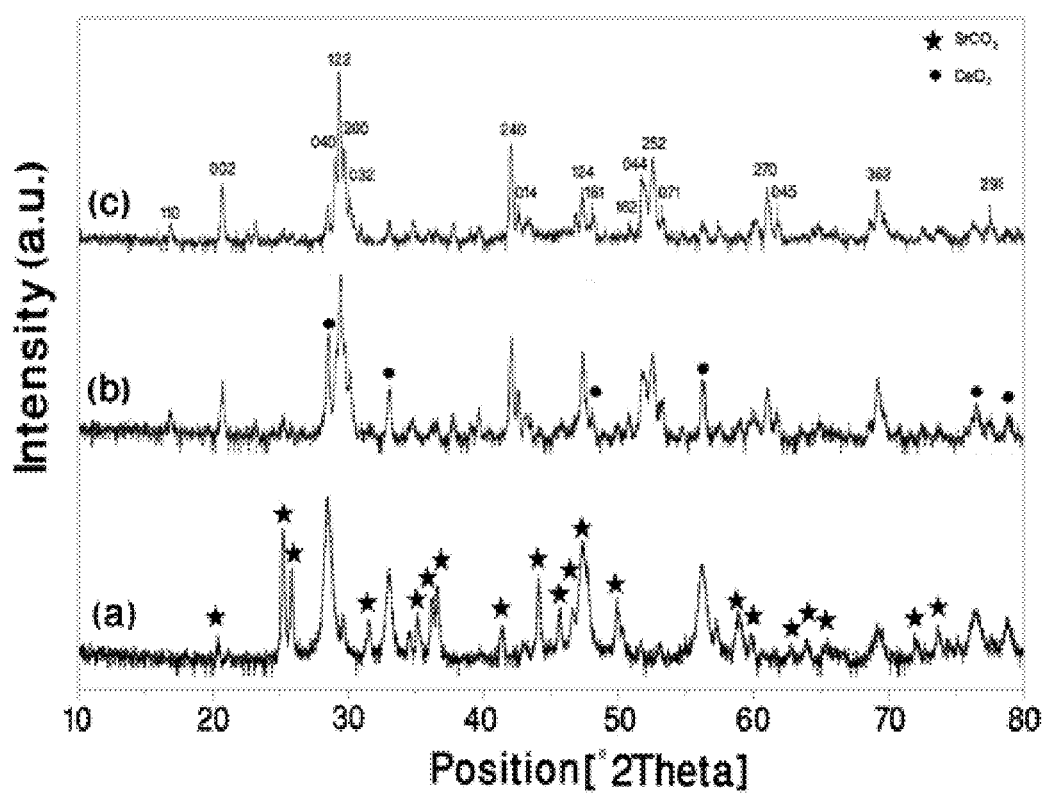
FIG. 2a-c illustrate example x-ray diffraction (XRD) patterns of strontium cerate nanoparticles calcined at 800° C. (a), 900° C. (b), and 1000° C. (c).

The XRD patterns of strontium cerate nanopowders calcined at 800° C., 900° C., and 1000° C. are shown in FIGS. 2a-c, respectively. As illustrated in FIG. 2a, strontium cerate nanopowder calcined at 800° C. exhibits a small impurity phase due to the presence of strontium carbonate ($SrCO_3$) in the nanopowder. Similarly, as illustrated in FIG. 2b, strontium cerate nanopowder calcined at 900° C. exhibits a small impurity phase due to the presence of cerium(IV) oxide ($CeO_2$) in the nanopowder. However, the XRD pattern of strontium cerate nanopowder calcined at 1000° C., as illustrated in FIG. 2c, is consistent with the spectrum of pure strontium cerate, and no peak attributable to possible impurities is observed.

The sharp diffraction peaks illustrated in FIG. 2c show that the synthesized strontium cerate nanoparticles have high crystallinity. The crystallite size of the synthesized strontium cerate nanoparticles was calculated based on the major diffraction peaks using the Debye-Scherrer equation (Eq. 1):

$$D = \frac{\kappa\lambda}{\beta\cos\theta} \quad (1)$$

The symbol K is a constant equal to 0.9, $\lambda$ is the x-ray wavelength used in XRD equal to 1.5418 Å, $\beta$ is the pure diffraction broadening of a peak at half-height, and $\theta$ is the Bragg angle. Using the Debye-Scherrer equation, the crystallite size of the synthesized strontium cerate nanoparticles was estimated to be about 32 nm.

Figure 3:
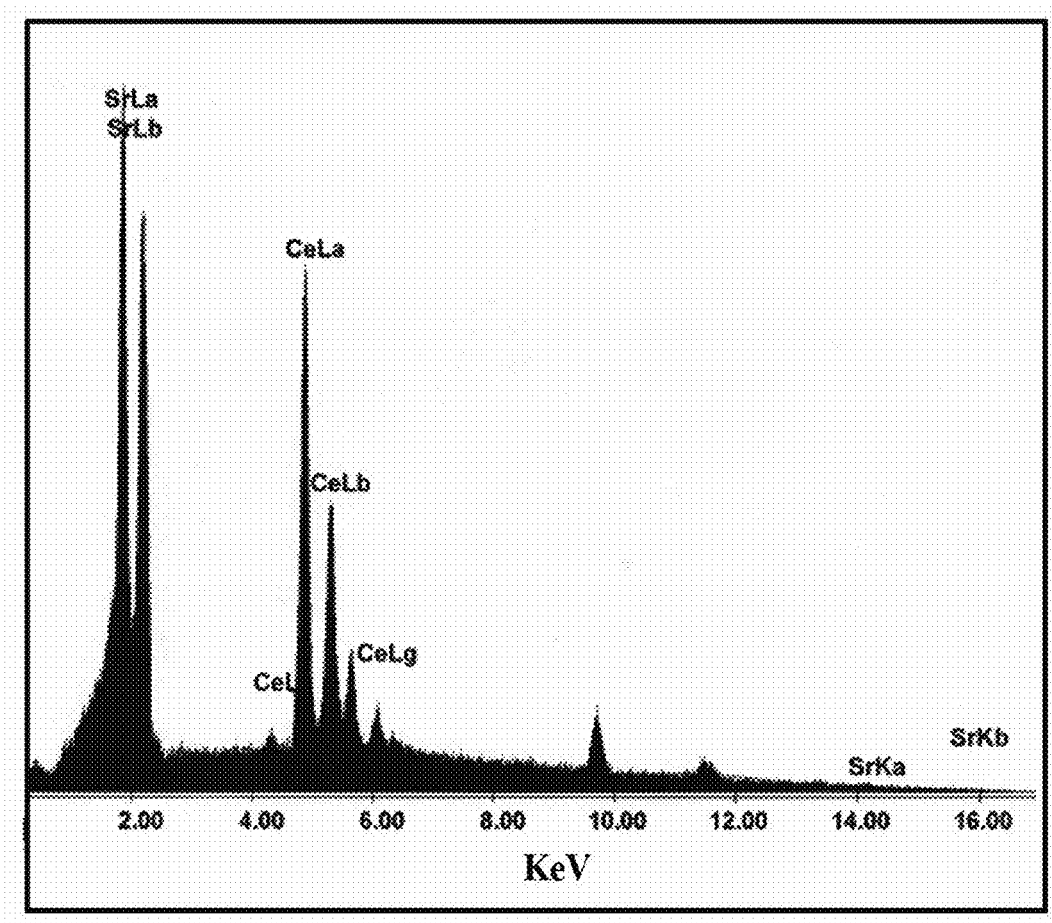
FIG. 3 illustrates an example energy dispersive X-ray spectroscopy (EDX) spectrum of strontium cerate nanoparticles.

Second, chemical purity and stoichiometry of the nanopowders were tested by energy dispersive X-ray spectroscopy (EDX). As illustrated by the EDX spectrum shown in FIG. 3, the atomic ratio of strontium to cerium in the synthesized strontium cerate nanopowder was determined to be almost equal to that of pure strontium cerate.

Figure 4:
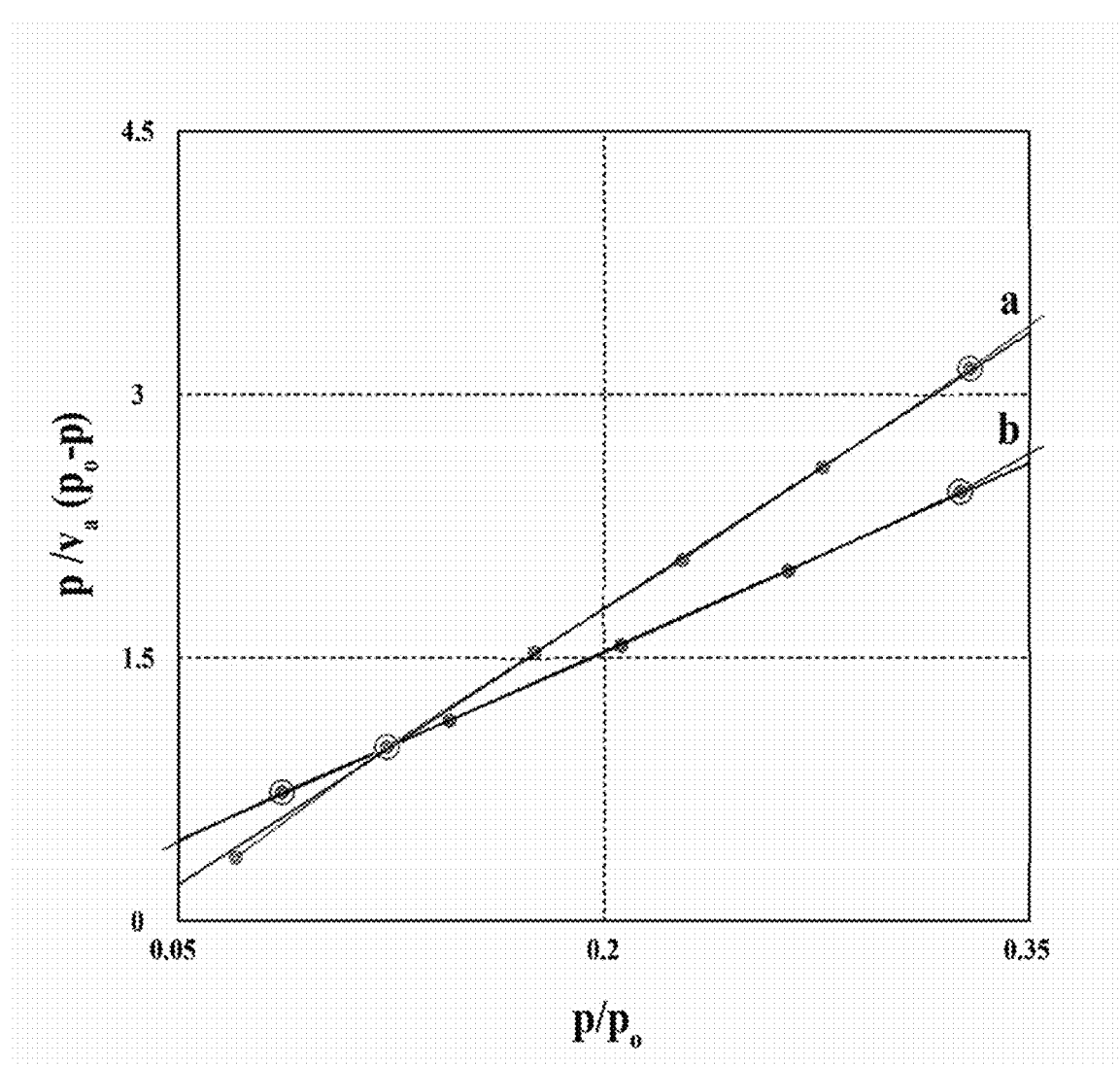
FIG. 4 illustrates example Brunauer-Emmet-Teller (BET) plots of nitrogen adsorption isotherms of strontium cerate nanoparticles calcined at 900° C. (a) and 1000° C. (b).

Third, the specific surface area of the synthesized strontium cerate nanoparticles was determined based on Brunauer-Emmet-Teller (BET) analysis. The BET measurements were performed on a Micromeritics Tristar 3000 analyzer. FIG. 4 shows the BET-plot of the $N_2$-adsorption isotherm of the strontium cerate nanoparticles calcined at 900° C. (line a) and 1000° C. (line b). The BET adsorption isotherm equation is (Eq. 2):

$$\frac{n}{n_m} = \frac{c\left(\frac{p}{p_0}\right)}{\left(1-\frac{p}{p_0}\right)\left(\frac{1+(c-1)p}{p_0}\right)} \quad (2)$$

The symbol n is the moles of adsorbed gas, $N_2$, at p, the pressure of the adsorbate. The symbol c is the BET parameter, $n_m$ is the monolayer capacity in moles, and $p_0$ is the saturation pressure of the adsorbate. The slope and intercept of the linearized form of the BET adsorption isotherm equation enable one of ordinary skill in the art to determine n. After obtaining n, the specific surface area of the synthesized strontium cerate nanoparticles can be calculated using the following equation (Eq. 3):

$$S_{BET} = nN_A\alpha_M \quad (3)$$

The symbol $S_{BET}$ represents the specific surface area of the strontium cerate nanoparticles, $N_A$ is the Avogadro constant, which is equal to $6.02\times10^{23}$ $mol^{-1}$, and $a_M$ is the area that a nitrogen molecule occupies, which is equal to $16.2\times10^{-20}$ $m^2$. Once the specific surface area is determined, the average crystalline size of the strontium cerate nanoparticles can be determined using the following equation (Eq. 4):

$$d_{BET} = \frac{6000}{\rho S_{BET}} \quad (4)$$

The symbol $d_{BET}$ represents the crystalline size of the strontium cerate nanoparticles and $\rho$ represents the density of the strontium cerate nanoparticles in grams per $cm^3$, which is equal to 5.81 $g/cm^3$. Using equation 4, the crystalline size of the strontium cerate nanoparticles was determined to be about 27 nm for nanoparticles calcined at 900° C. and about 21 nm for nanoparticles calcined at 1000° C. The difference in size for the two samples calcined at different temperatures can be due to the higher purity of the samples calcined at 1000° C., as explained above. The inconsistency between the crystalline size determined by the XRD and BET methods can be due to conglomeration in the synthesized strontium cerate nanopowders, as shown in FIG. 6, for example.

Figure 5:
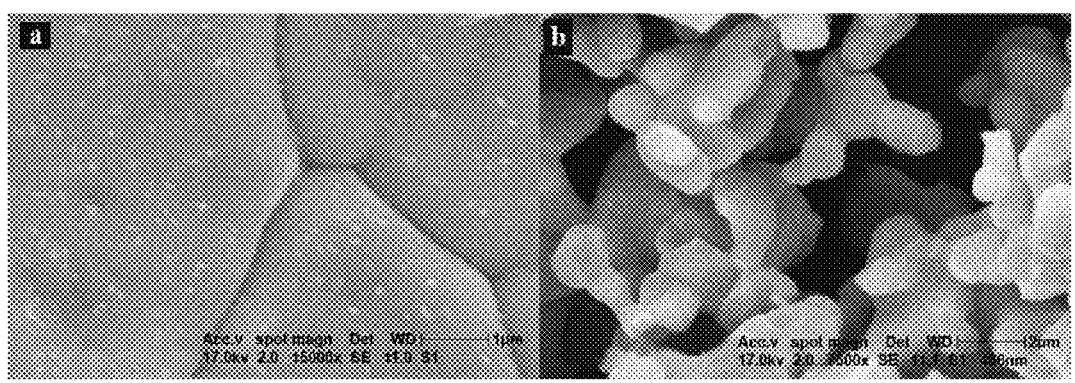
FIGS. 5a-b illustrate example scanning electron microscopic (SEM) micrographs of strontium cerate nanoparticles calcined at 1000° C. for 2 hours at high magnification (a) and at low magnification (b).

Fourth, the morphology of the synthesized strontium cerate nanoparticles calcined at 1000° C. is illustrated by the scanning electron microscope (SEM) micrographs of FIGS. 5a-b. At the higher magnification of 15,000 times illustrated in FIG. 5a, the morphology of the nanoparticles appears to consist of large, highly dense crystals, whereas at the lower magnification of 7,500 times illustrated in FIG. 5b, the crystal morphology appears to be granular and porous with small particles.

Figure 6:
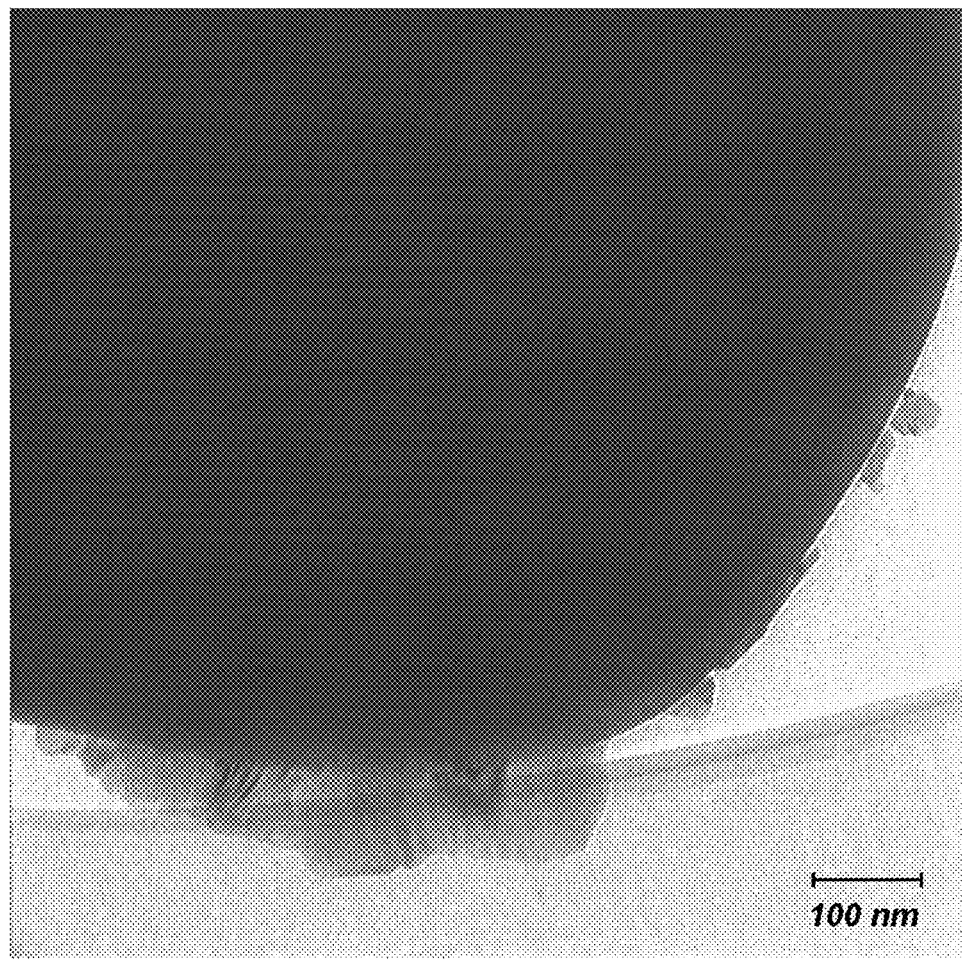
FIG. 6 illustrates an example transmission electron microscopic (TEM) micrograph of strontium cerate nanoparticles calcined at 1000° C.

Fifth, the morphology of the synthesized strontium cerate nanoparticles calcined at 1000° C. is also illustrated by the transmission electron microscopic (TEM) micrograph of FIG. 6. The TEM micrographs were captured with a Philips Model EM 208 microscope at an accelerating voltage of 100 kV. As illustrated in FIG. 6, the strontium cerate nanoparticles appear to be agglomerated.

It is to be understood the implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a", "an" and "the" include plural referents unless the content clearly indicates otherwise.

Reference in the specification to "one embodiment" or "an embodiment" means that a particular feature, structure, characteristic, or function described in connection with the embodiment is included in at least one embodiment herein. The appearances of the phrase "in some embodiments" in the specification do not necessarily all refer to the same embodiment.

Accordingly, other embodiments and/or implementations are within the scope of this application.

What is claimed is:

1. A method for synthesizing strontium cerate ($SrCeO_3$) nanoparticles, the method comprising:
    reacting ammonium cerium(IV) nitrate ($(NH_4)_2Ce(NO_3)_6$) and n-butanol ($C_4H_{10}O$) to synthesize cerium-n-butoxide ($Ce(OBu)_4$);
    reacting the cerium-n-butoxide, strontium acetate ($Sr(CH_3COO)_2$), and stearic acid ($C_{18}H_{36}O_2$) to form a homogenous solution including strontium cerate nanoparticles;
    drying the homogenous solution in a heated environment to form a homogenous gel including strontium cerate nanoparticles; and
    calcining the homogenous gel at a temperature between 800° C. and 1000° C. to crystallize the strontium cerate nanoparticles.

2. The method of claim 1, wherein reacting the ammonium cerium(IV) nitrate and the n-butanol to synthesize the cerium-n-butoxide comprises reacting the ammonium cerium(IV) nitrate and 1-butanol to synthesize the cerium-n-butoxide.

3. The method of claim 1, wherein reacting the ammonium cerium(IV) nitrate and the n-butanol to synthesize the cerium-n-butoxide comprises removing ammonium nitrate ($NH_4NO_3$) from a solution including the synthesized cerium-n-butoxide.

4. The method of claim 1, wherein calcining the homogenous gel comprises calcining the homogenous gel at a temperature of 1000° C. for two hours.

5. The method of claim 1, wherein reacting the cerium-n-butoxide, the strontium acetate, and the stearic acid to form the homogenous solution including the strontium cerate nanoparticles comprises reacting the cerium-n-butoxide, the strontium acetate, and melted stearic acid to form the homogenous solution including the strontium cerate nanoparticles.

6. The method of claim 1, wherein drying the homogenous solution in the heated environment to form the homogenous gel including strontium cerate nanoparticles comprises cooling the homogenous gel to room temperature.

* * * * *